United States Patent
Zhang (10) Patent No.: US 10,018,995 B2
(45) Date of Patent: Jul. 10, 2018

(54) METHOD AND APPARATUS FOR OPTIMIZING PERFORMANCE OF ROBOTIC CELL

(71) Applicant: ABB Schweiz AG, Baden (CH)

(72) Inventor: Jiafan Zhang, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/173,050

(22) Filed: Jun. 3, 2016

(65) Prior Publication Data
US 2016/0282855 A1    Sep. 29, 2016

Related U.S. Application Data

(63) Continuation of application No. PCT/CN2014/071666, filed on Jan. 28, 2014.

(51) Int. Cl.
*G06F 19/00*    (2018.01)
*G05B 19/418*    (2006.01)
*B25J 9/16*    (2006.01)

(52) U.S. Cl.
CPC ........ *G05B 19/4188* (2013.01); *B25J 9/1671* (2013.01); *G05B 19/41865* (2013.01);
(Continued)

(58) Field of Classification Search
CPC ...... G05B 19/4188; G05B 2219/31054; G05B 2219/40479; B25J 9/1671; Y02P 90/04; Y02P 90/24
See application file for complete search history.

(56) References Cited

U.S. PATENT DOCUMENTS 4,979,128 A    12/1990  Seki et al.
5,825,660 A    10/1998  Cagan et al.
(Continued)

FOREIGN PATENT DOCUMENTS

EP    1090723 A2    4/2001
WO    2005049284 A1    6/2005

OTHER PUBLICATIONS

State Intellectual Property Office of the P.R. China, International Search Report & Written Opinion issued in corresponding Application No. PCT/CN2014/071666, dated Jul. 9, 2014, 13 pp.
(Continued)

*Primary Examiner* — Mingjen Jen
(74) *Attorney, Agent, or Firm* — Taft Stettinius & Hollister LLP (57) ABSTRACT

Embodiments of the present disclosure relate to a method and apparatus for optimizing performance of a robotic cell. The robotic cell comprises at least one workstation and at least one robot. The method may comprise determining a factor and a corresponding workstation sensitive to the performance of the robotic cell by performing a sensitivity analysis on an initial cell layout for the robotic cell; and performing a performance optimization process on the corresponding workstation based on the determined factor to obtain an improved cell layout for the robotic cell. With embodiments of the present disclosure, it is possible to perform performance optimization of the robotic cell on the sensitive workstation regarding to the sensitive factor, and thus it may efficiently determine an improved cell layout which may achieve performance improvement.

19 Claims, 7 Drawing Sheets

(52) U.S. Cl.
CPC ............... *G05B 19/41885* (2013.01); *G05B 2219/31054* (2013.01); *G05B 2219/32085* (2013.01); *G05B 2219/39326* (2013.01); *G05B 2219/40479* (2013.01); *Y02P 90/04* (2015.11); *Y02P 90/24* (2015.11)

(56) References Cited

U.S. PATENT DOCUMENTS

| | | | |
|---|---|---|---|
| 6,470,301 | B1 | 10/2002 | Barral |
| 6,526,373 | B1* | 2/2003 | Barral .................... B25J 9/1666 700/245 |
| 6,847,922 | B1* | 1/2005 | Wampler, II ....... G05B 19/4069 700/251 |
| 8,401,698 | B2 | 3/2013 | Kamrani et al. |
| 9,492,927 | B2* | 11/2016 | Diolaiti .................. B25J 9/1689 |
| 9,555,546 | B2* | 1/2017 | Hamm .................. B25J 9/1643 |
| 9,622,826 | B2* | 4/2017 | Diolaiti .................. A61B 34/30 |
| 9,682,476 | B1* | 6/2017 | Prats ....................... B25J 9/1664 |
| 2003/0060931 | A1 | 3/2003 | Kumar et al. |
| 2004/0230334 | A1 | 11/2004 | Geismar et al. |
| 2005/0004709 | A1 | 1/2005 | Watanabe et al. |
| 2007/0106421 | A1 | 5/2007 | Kamrani et al. |
| 2010/0241248 | A1* | 9/2010 | Zhang ............. G05B 19/41885 700/29 |

OTHER PUBLICATIONS

M. F. Aly, A. T. Abbas, S. M. Megahed, "Robot Workspace Estimation and Base Placement Optimisation Techniques for the Conversion of Conventional Work Cells Into Autonomous Flexible Manufacturing Systems", International Journal of Computer Integrated Manufacturing, 2010, vol. 23, No. 12, pp. 1133-1148.

A. Tubaileh, I. Hammad, L. Kafafi, "Robot Cell Planning", World Academy of Science, Engineering and Technology 2, 2007, pp. 250-253.

T. C. Lueth, "Automated Planning of Robot Workcell Layouts", Proceeding of IEEE International Conference on Robotics and Automation, Nice, France, May 12-14, 1992, pp. 1103-1108.

B. Nelson, M. Donath, "Optimizing the Location of Assembly Tasks in Manipulator's Workspace", Journal of Robotic Systems, vol. 7, No. 6, 1990, pp. 791-811.

B. B. Xiang, W. D. Chen, D. D. Zhang, L. W. Qi, "Robot Workcell Layout Optimization Based on Genetic Algorithm", Journal of Shanghai Jiaotong University, vol. 42, No. 10, 2008, pp. 1697-1701, See English Language Abstract.

M. Givehchi, A. Ng, L. Wang, "Evolutionary Optimization of Robotic Assembly Operation Sequencing with Collision-Free Paths", Journal of Manufacturing Systems, vol. 30, No. 4, 2011, pp. 196-203.

B. Kamrani, V. Berbyuk, D. Wappling, U. Stickelmann, X. L. Feng, "Optimal Robot Placement Using Response Surface Method", International Journal of Adcanced Manufacturing Technology, vol. 44, 2009, pp. 201-210.

J. F. Zhang, X. Y. Fang, "Response Surface Method Based Robotic Cells Layout Optimization in Small Part Assembly", Proceedings of the 44th International Symposium on Robotics, Soul, Korea, Oct. 25, 2013, pp. 1-7.

S. P. Sethi, C. Sriskandarajah, G. Sorger, J. Blazewicz, W. Kubiak, "Senquencing of Parts and Robot Moves in a Robotic Cell", International Journal of Flexible Services and Manufacturing, vol. 4, No. 3-4, 1992, pp. 331-358.

M. Dawande, H. N. Geismar, S. P. Sethi, C. Sriskandarajah, "Senquencing and Scheduling in Robotic Cells: Recent Developments", Journal of Scheduling, vol. 8, 2008, pp. 387-426.

N. G. Hall, C. Sriskandarajah, "A Survey of Machine Scheduling Problems with Blocking and No-Wait in Process", Operation Research, vol. 44, 1996, pp. 510-525.

H. Chen, C. Chu, J. Proth, "Cyclic Scheduling of a Hoist With Time Window Constraints", IEEE Transactions on Robotics and Automation, vol. 14, 1998, pp. 144-152.

H. Gultekin, M. S. Akturk, O. E. Karasan, "Cyclic Scheduling of a 2-Machine Robotic Cell with Tooling Constraints", European Journal of Operational Research, vol. 174, No. 2, 2006, pp. 777-796.

H. Gultekin, M.S. Akturk, O. E. Karasan, "Scheduling in Robotic Cells: Process Flexibility and Cell Layout", International Journal of Productions Research, vol. 46, No. 8, 2008, pp. 2105-2121.

M. S. Akturk, H. Gultekin, O. E. Karasan, "Robotic Cell Scheduling with Operational Flexibility", Discrete Applied Mathematics, vol. 145, 2005, pp. 334-348.

P. Brucker, T. Kampmeyer, "A General Model for Cyclic Machine Scheduling Problems", Discrete Applied Mathematics, vol. 156, No. 13, 2008, pp. 2561-2572.

N. Brauner, G. Finke, W. Kubiak, "Complexity of One-Cycle Robotic Flow Shops", Journal of Scheduling, vol. 6, No. 4, 2003, pp. 355-371.

Anonymous, Sensitivity Analysis—Wikipedia, Oct. 27, 2013, 15 pages.

Extended European Search Report, European Patent Application No. 14881163.1, Nov. 7, 2017, 10 pages.

Chinese Office Action, Chinese Application No. 201480074215.6, Jan. 31, 2018, 12 pages. English Language Translation Provided.

Chinese Search Report, Chinese Application No. 201480074215.6, Jan. 31, 2018, 4 pages. English LanguageTranslation Provided.

\* cited by examiner

METHOD AND APPARATUS FOR OPTIMIZING PERFORMANCE OF ROBOTIC CELL

FIELD OF THE INVENTION

Embodiments of the present disclosure generally relate to a robotic cell and more particularly relate to a method and apparatus for optimizing performance of a robotic cell.

BACKGROUND OF THE INVENTION

In an environment of intensive global competition, robot-centered cells are playing more and more important roles in incorporating automation and repetitive processing for improving productivity and quality. The robotic-centered cell, also called as the robotic cell, is a manufacturing cell in which loading and unloading operations are performed by one ore more robots. The robotic cell usually includes a series of workstations, and one or more robots. Amongst the workstations, one acting as a feed-in device is configured to feed into work pieces to be processed; another acting as a feed-out device is configured to output the processed work pieces; and other workstations functioning as processing workstations performs processing operations on work pieces in a fixed sequence. In the meantime, the one or more robots are responsible for transporting the work pieces within the cell from one processing workstation to another.

Figure 1:
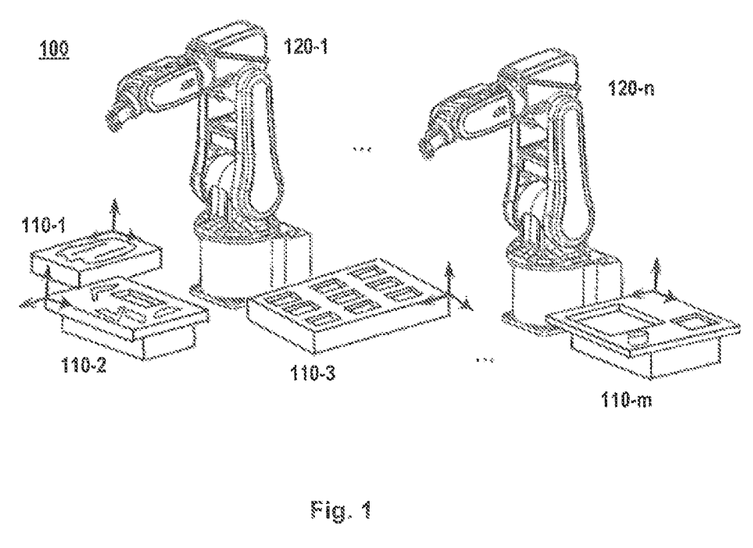
FIG. 1 schematically illustrates a diagram of an example robotic cell in the prior art.

Only for a purpose of illustration, FIG. 1 illustrates a pictorial diagram for a general robotic cell in the prior art. As illustrated in FIG. 1, it is clear that the robotic cell 100 includes m workstations 110-1 to 110-$m$ and $n$ robots 120-1 to 120-$n$. In FIG. 1, for a purpose of simplification, a feed-in device, a feed-out device and processing workstation are generally illustrated as workstation without being differentiated clearly, however, it should be noted that the robotic cell 100 usually comprise all of a feed-in device, processing workstations and a feed-out device. The robotic cell 100 is normally in a flow-shop type, and in a cyclic production, each work piece usually passes through finite workstations in the same order.

For performance of the robotic cell, a direct and widely used measure of efficiency is for example productivity, particularly throughput of the cell, i.e., the number of finished parts produced per unit time slot. How to achieve the maximum/near-maximum throughput in a robotic cell, even a small improvement in throughput, is always a highlighted objective, especially in communication, computer and consumer electronics (3C) industry.

In the above-mentioned cyclic production, the cycle time is referred to the duration during which the sequence of the movements and operations are completed in a normal iteration to produce the work piece. Thus, maximizing the throughput is to pursue the minimum cycle time.

Figure 2:
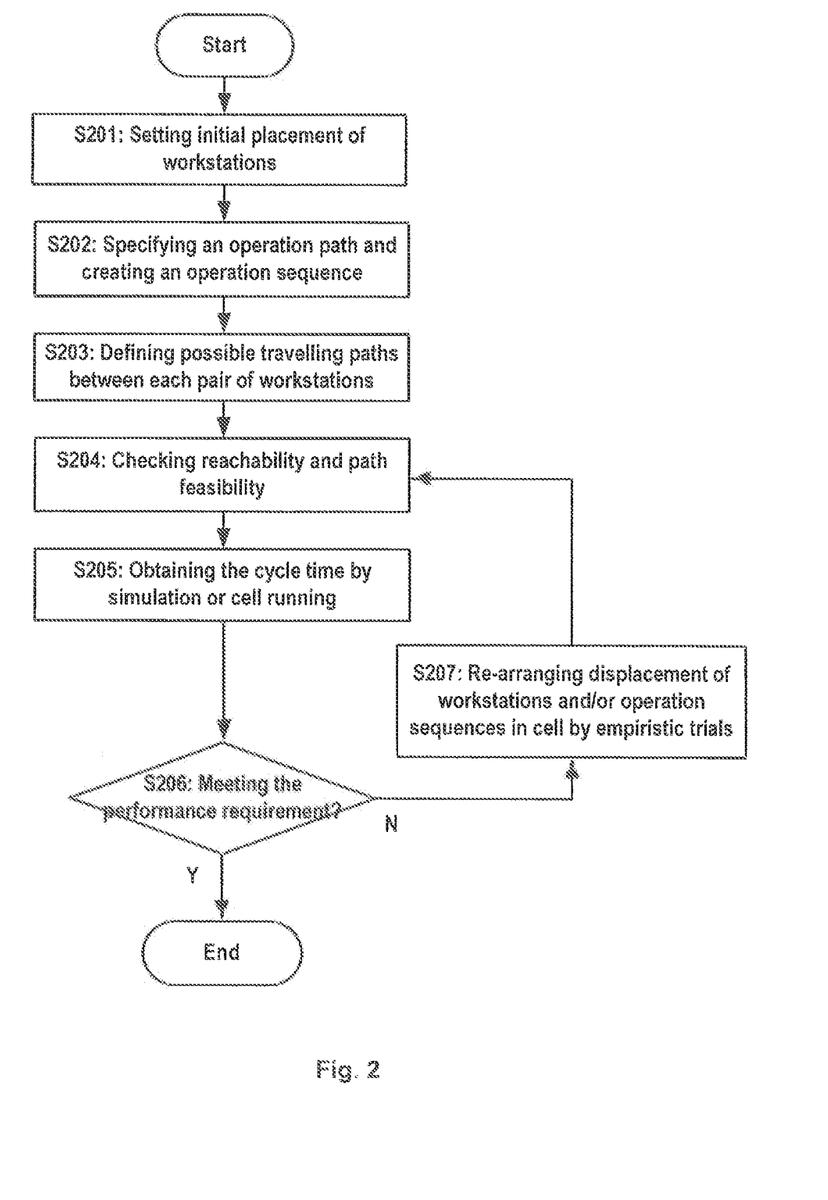
FIG. 2 schematically illustrates a flow chart of an example cell layout determination for a robotic cell in the prior art.

In the existing cell layout determination, it usually uses a try-and-error-loop but time-consuming working loop and in FIG. 2 is schematically illustrated a flow chart of an example cell layout determination for a robotic cell in the prior art. As illustrated in FIG. 2, initial placement of workstations is set at step S201; then based on the initial placement of the workstations, an operation path is determined and an operation sequence is created at step S202; and afterwards possible travelling paths between each pair of workstations are defined. Subsequently, the reachability and path feasibility are checked based on predetermined check rules at step S203 and after that, the cycle time is obtained by for example, cell simulation or cell running, if it is determined at step S206 that the performance requirement is met, the process is ended, otherwise at step S207, the placement of the workstations and/or the sequence of the operations in a robotic cell are rearranged by empiristic trials. Next, operations of steps S204 to S207 may be performed repeated until the performance requirement is met. However, from the example flow chart, it may be noticed that the cell layout determination process is severely dependent on the experience of engineers, and it just like buying a lottery on the cycle time performance, due to lack of efficient means.

In the prior art, there was proposed to improve the cycle time to produce a part by determining arrangement of workstation in a cell or optimizing the scheduling in the robotic cell. However, these methods are mainly directed to a robotic cell with a simple cell layout, and when facing a robotic cell comprising many robots and workstations, it is still hard to achieve a productivity improvement for a robotic cell in an efficient way.

SUMMARY OF THE INVENTION

In view of the foregoing, the present disclosure provides an improved solution for robotic cell optimization so as to solve or at least partially mitigate at least a part of problems in the prior art.

According to a first aspect of the present disclosure, there is provided a method for optimizing performance of a robotic cell, wherein the robotic cell comprises at least one workstation and at least one robot. The method comprises determining a factor and a corresponding workstation sensitive to the performance of the robotic cell by performing a sensitivity analysis on an initial cell layout for the robotic cell; and performing a performance optimization process on the corresponding workstation based on the determined factor to obtain an improved cell layout for the robotic cell.

In an embodiment of the present disclosure, the determining a factor and a corresponding workstation sensitive to the performance of the robotic cell may comprise: performing a sensitivity analysis on the at least one workstation in the robotic cell regarding processing time and travelling time; ranking influences of the processing time and the travelling time on the at least one work station based on sensitivity analysis results; and determining one of the processing time and the travelling time and a workstation associated therewith which have the greatest influence on the performance of the robotic cell as the factor and the corresponding workstation sensitive to the performance of the robotic cell.

In another embodiment of the present disclosure, if the determined factor is processing time, a performance optimization process regarding a robotic cell pattern with scheduling may be performed. The performance optimization process regarding a robotic cell pattern with scheduling may comprise at lease one of robotic cell pattern optimization and operations sequences optimization.

In a further embodiment of the present disclosure, if the robotic cell pattern optimization is to be performed, the optimal number of workstations that can be newly added in the robotic cell may be further determined by determining a number of workstations which can achieve cost effectiveness from sensitivity analysis results.

In a yet embodiment of the present disclosure, if the determined factor is travelling time, a performance optimization process regarding workstation displacement may be performed.

In a still further embodiment of the present disclosure, the determining a factor and a corresponding workstation and the performing a performance optimization process may be repeated with an improved cell layout newly obtained as a new initial cell layout until an improved cell layout meeting the performance requirement is obtained.

In a yet further embodiment of the present disclosure, the method may further comprise: performing displacement of the at least one workstation and/or a robotic cell scheduling based on the improved cell layout.

According to a second aspect of the present disclosure, there is further provided an apparatus for optimizing performance of a robotic cell, wherein the robotic cell comprises at least one workstation and at least one robot. The apparatus comprises a factor and workstation determination unit, configured to determine a factor and a corresponding workstation sensitive to the performance of the robotic cell by performing a sensitivity analysis on an initial cell layout for the robotic cell; and a performance optimization unit configured to perform a performance optimization process on the corresponding workstation based on the determined factor to obtain an improved cell layout for the robotic cell.

With embodiments of the present disclosure, it is possible to perform performance optimization of the robotic cell on the sensitive workstation regarding to the sensitive factor, and thus it may efficiently determine an improved cell layout which may achieve performance improvement for the cell robotic.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

DETAILED DESCRIPTION OF EMBODIMENTS

Hereinafter, embodiments of the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or block may represent a module, a program, or a part of code, which contains one or more executable instructions for performing specified logic functions and indispensible step, operation, or block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Next, reference will be made to FIG. 3 to illustrate a flow chart of an example method for optimizing performance of a robotic cell according to an embodiment of the present disclosure.

Figure 3:
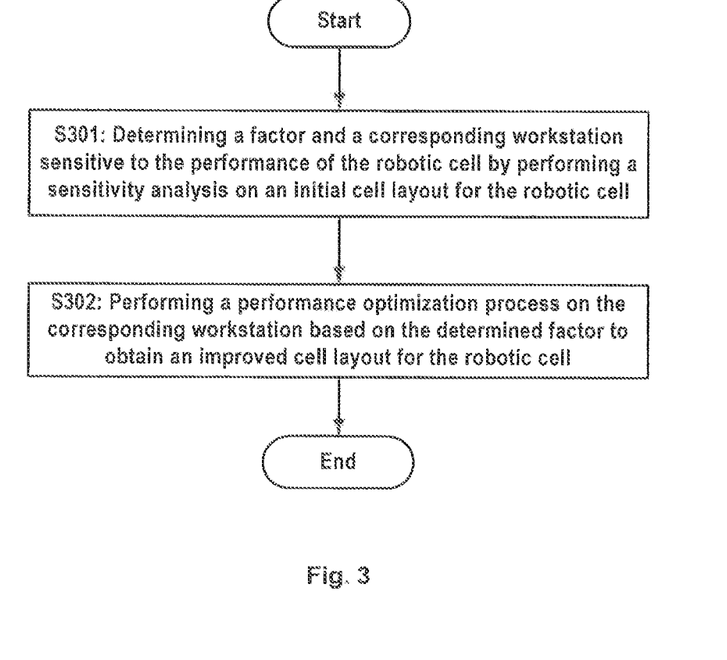
FIG. 3 schematically illustrates a flow chart of a method for optimizing performance of a robotic cell according to an embodiment of the present disclosure.

As illustrated in FIG. 3, first at step S301, a factor and a corresponding workstation sensitive to the performance of the robotic cell is determined by performing a sensitivity analysis on an initial cell layout for the robotic cell.

Figure 4:
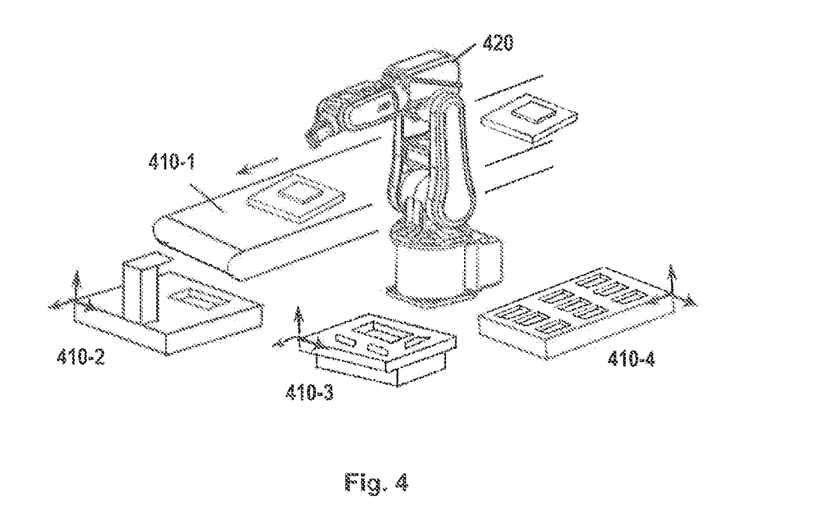
FIG. 4 schematically illustrates a diagram of an example robotic cell in which embodiments of the present disclosure can be implemented.

Hereinafter, before further describing solutions of the present disclosure in details, an example robotic cell will be briefly introduced first with reference to FIG. 4, which illustrates an example robotic cell only for a purpose of illustration. As illustrated in FIG. 4, the example robotic cell 400 may include four workstations 410-1 to 410-4 and one robot 420. Among the four workstations, workstation 410-1 may function as a feed-in device while workstation 410-4 may function as a feed-out device. The other two workstations 410-2 and 410-3 are processing workstations.

For the example robotic cell, an initial cell layout may be determined first. The initial cell layout may be determined by means of any approach which is known in the prior art, for example a process as illustrated in FIG. 2. Hereinafter, for a purpose of illustration, an example process using an optimization solution will be described.

First, initial placement of workstations may be set as, for example, a default setting as long as the setting enables normal running of the robotic cell. Then, based on the initial replacement of workstations, an operation path may be specified and an operation sequence may be created accordingly. Next, reachability and path feasibility may be checked to determine the operation path and operation sequences are practicable. Afterwards, simulation or cell running is performed to obtain the traveling time and processing time of the robotic cell.

Figure 5:
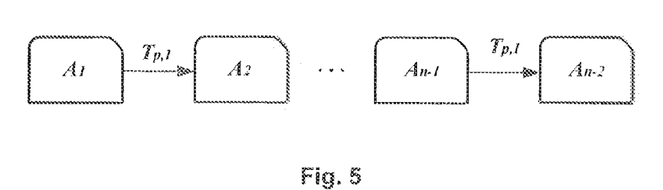
FIG. 5 schematically illustrates a diagram of a scheduling scheme of an example producing sequence according to an embodiment of the present disclosure.

Thus, a scheduling scheme of a producing sequence for example as illustrated in FIG. 5 may be obtained. In a robotic cell, normally the work piece passes through the workstations on each process stage. Or in other words, there would be many activities $A_1$ to $A_n$ (i.e., travelling) to be done and between each pair of activities is the processing action on every workstation, just as illustrated in FIG. 5. Generally, a standard producing sequence can be defined as an activity vector (A1, A2, A3, . . . , An).

Figure 6:
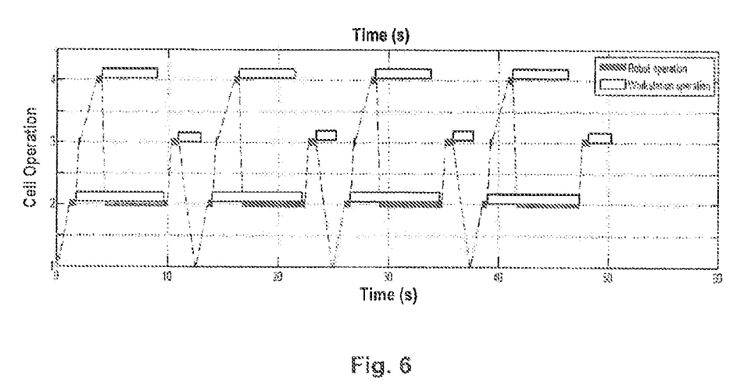
FIG. 6 schematically illustrates a diagram of an optimized operation sequence according to an embodiment of the present disclosure.

Moreover, optionally, cell scheduling optimization may be further performed to obtain an optimization schedule. This optimization may be performed based on any of robotic cell scheduling optimization schemes which are already know in the art, such as global searching. Herein, for a purpose of not obscuring the present disclosure; their details will not be elaborated. An example optimal or near optimal robotic scheduling or operation sequence is illustrated in FIG. 6 in which the horizontal axis indicates the index of workstations and the number of 1 to 4 are respectively corresponding to workstations 410-1, to 410-4. From FIG. 6 it may be understood that, all workstations 410-1 to 410-4 and the robot 420 will begin their respective operations at a certain time and last for a certain period according to the scheduling.

The initial placement of workstation, the operation path, the operation sequence, the travelling path and the optimal schedule may be taken as the initial cell layout. However, it should be noted that a cell layout obtained without performing optimization process may also be taken as the initial cell layout. Based on this initial cell layout, a sensitivity analysis may be performed on the robotic cell.

The sensitivity analysis is a process for figuring out how changes of performance of the robotic cell (such as the productivity, cost effectiveness, power saving, lifetime) relative to process parameters (such as the processing time, the travelling time, etc). The sensitivity analysis process may be performed by changing process parameters of each workstation step by step and determining the corresponding performance change (i.e., improvement or degradation) of the robotic cell. Taking the cycle time as an example of the performance and the processing time and travelling time as an example of process parameters, the processing time for a work station as specified by the initial cell layout may be taken as the reference value; then the processing time of the work station may be reduced or increased by a certain percentage each time while other process parameters such as the travelling time is kept as it is; next the corresponding cycling time is determined based on the reduced or increased processing time by for example cell simulation or cell running. For example, the processing time may be changed from 20% to 110% of the reference time with a step of 10%. The similar operations may be performed on each workstation and each process parameter. In such a way, we can obtain sensitivity analysis results gives the performance changes with each process parameters.

Figure 7:
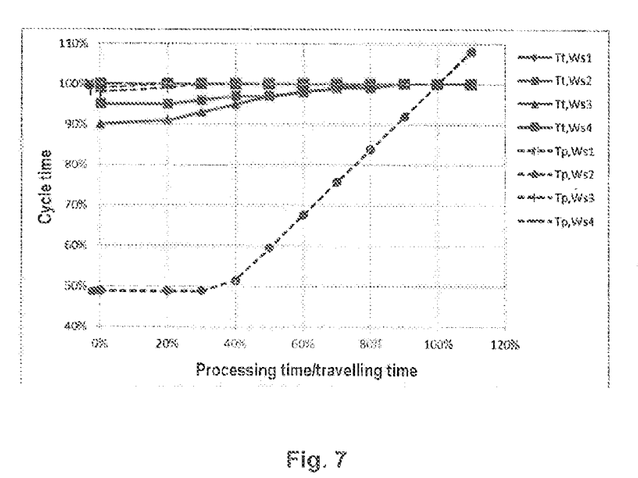
FIG. 7 schematically illustrates a diagram of sensitivity analysis results according to an embodiment of the present disclosure.

FIG. 7 schematically illustrates example sensitivity analysis results according to an embodiment of the present disclosure. From FIG. 7, it may be clearly seen changes of the cycle time with the processing/travelling time, i.e. the influence of the processing/travelling time on the cycle time. Then, based on sensitivity analysis results, the influences of the processing time and the travelling time on the at least one work station may be ranked. Then process parameter (the process time or travelling time) and a corresponding workstation which have the greatest influence on the performance of the robotic cell may be determined as the factor and the corresponding workstation sensitive to the performance of the robotic cell. Taking the sensitivity analysis results as recited in FIG. 7 as example, the processing time of the workstation Ws2 (i.e., workstation 410-2) has the greatest influence on the cycle time and thus the processing time and the workstation 410-2 may be considered as the factor and the corresponding workstation sensitive to the performance of the robotic cell.

If the traveling time of a workstation is determined as the sensitive factor, apparently, there is a large margin to improve the cycle time by adjusting the displacement of the workstation relative to the robot and other workstations. That is to say, in such a case, a performance optimization process regarding workstation displacement will be performed. Depending on how complicated constraints used in adjusting the displacement of the workstation are introduced, different types of optimization method can be used, e.g. response surface method, annealing simulation, genetic algorithm, etc. If a sweet point to locate this workstation can be successfully found, the cycle time can shortened.

Figure 8:
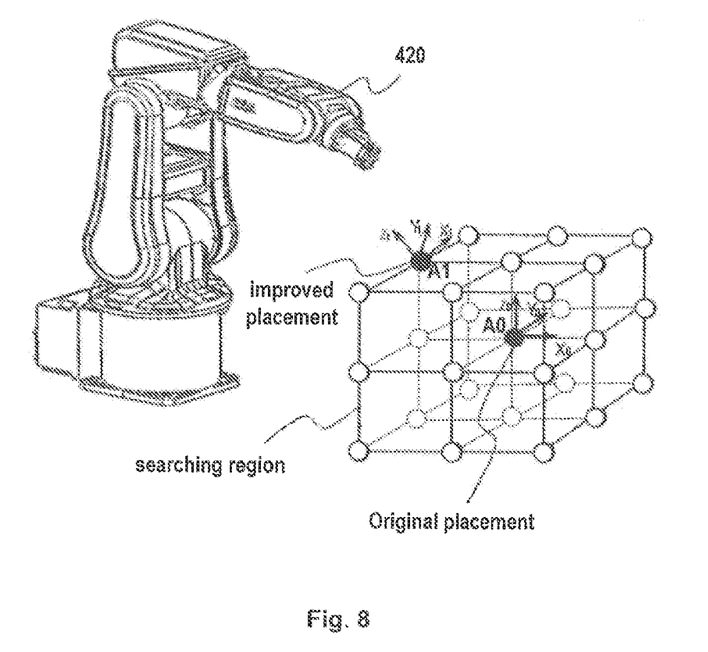
FIG. 8 schematically illustrates a diagram of a workstation replacement optimization process according to an embodiment of the present disclosure.

Hereinafter, only for a purpose of illustration, an example process of determining the displacement of the workstation will be described with reference to FIG. 8. As illustrated in FIG. 8, initial placement of the workstation may be taken as point $A_0$ ($x_0$, $y_0$, $z_0$) and then a searching region is formed, which may be cubic region comprising for example 27 points (illustrated by circles) by taking point $A_0$ as a center point. These points represent different locations of the workstation. For each of the points, their respective corresponding cycle time may be determined and a new point $A_1$ ($x_1$, $y_1$, $z_1$) which could achieve the shortest cycle time may be determined. Then, the point $A_1$ ($x_1$, $y_1$, $z_1$) may be take as a new starting point and the above operations of forming the searching region and determining a cycle time corresponding to each location may be performed again. The operations may be repeated until the distance between two points determined recently are lower than a predetermined distance or it has achieved a predetermined cycle time improvement. In such a way, the optimal location of the workstation may be determined.

Figure 9:
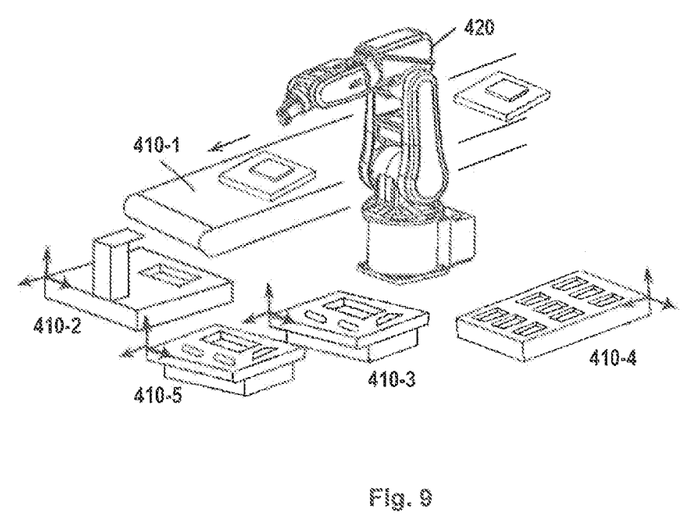
FIG. 9 schematically illustrates a diagram of cell pattern optimization process according to an embodiment of the present disclosure.

On the other hand, if it is determined that the processing time is the most sensitive factor, it means that the most effective way is to shorten the processing time on the corresponding workstation. Therefore, a performance optimization process regarding a robotic cell pattern with scheduling. Normally, the processing time can be shortened by optimizing the scheduling or changing the cell pattern. The scheduling optimization may be performed in any known method so as to shorten the processing time. On the other hand, the cell pattern may be changed so as to shorten the processing time. For example, by introducing one or more extra workstation(s) parallel to the determined workstation, whose processing time is most sensitive to the cycle time, it may also achieve the shortening of process time. For instance, for FIG. 7, the processing time of workstation 410-2 (Ws2) is most sensitive to the cycle time, therefore, another workstation 410-5 which is parallel to workstation 410-2 can be newly added into this robotic cell to increase the productivity, as illustrated in FIG. 9.

However, it may be understood that, for a robotic cell, adding parallel workstation is not always an effective way. In stead, there is the upper boundary of the number of effective parallel workstations on every stage. Suppose the processing time on the stage i is the most sensitive to the cycle time, and there are already m workstations on this stage. If the introduction of k+1 workstations to this stage I could not improve cycle time any more or the improvement is too little, compared to adding k parallel workstations, then k is the value of the maximum number of effective parallel workstations on the stage i.

If a throughput that implies the per unit cycle time is specified by a customer, then the number of fewest workstations required for each stage to meet the cycle time requirement can be indicated through results of the sensitivity analysis. As illustrated in FIG. 7, the sensitivity analysis results provide a clear overview of the scheduling and links between throughput and cell pattern, by comparing the resulting increase in revenue with the additional equipment costs. That is to say, the optimal number of workstations that can be newly added in the robotic cell may be further determined, for example, by determining a number of workstations which can achieve cost effectiveness from sensitivity analysis results. Therefore, the sensitivity analysis results may also indicate the number of fewest workstations required for each stage to meet the cycle time requirement. In such a way, based on the sensitivity analysis results, proper optimization process can be performed and as a result, an improved cell layout for the robotic cell may be obtained.

In an embodiment of the present disclosure, it may further be determined whether the improved cell layout meets the performance requirement such as a predetermined throughput. If yes, the method may be ended; otherwise, he improved cell layout may be taken as a new initial cell layout and the method may be performed again. In other words, the determining a factor and a corresponding workstation and the performing a performance optimization process may be repeated with an improved cell layout newly obtained as a new initial cell layout until an improved cell layout meeting the performance requirement is obtained.

Based on the determined improved cell layout, it may perform displacement of the at least one workstation and/or a robotic cell scheduling. In a case that the optimal workstation location as determined by performance process is different from the original location of the workstation, location of the workstation may be changed to the finally determined optimal location. On the other hand, if any one of the robotic cell pattern and operations sequences is changed during the performance process, it may change the robotic cell pattern at the determined optimal robotic cell pattern, or control the workstations and robots to operate in accordance with the determined optimal operation sequences. It is known to perform the displacement of the at least one workstation and/or a robotic cell scheduling according a predetermined cell layout and thus details thereof will not be provided herein.

With embodiments of the present disclosure, the sensitivity analysis may be performed based on an initial cell layout to find the factor and the workstation sensitive to the performance of the robotic cell. Thus, it is possible to perform the performance optimization on the workstation regarding the sensitive factor so as to efficiently determine a cell layout which may achieve performance improvement. That is to say, in embodiments of the present disclosure, the cell layout determination is dependent on the sensitivity analysis instead on expert's experience and thus uncertainty and randomness of cell layout determination can be removed. Therefore, it may optimize the performance to the sensitive workstation regarding to the sensitive factor and an improved cell layout may determined in an efficient way.

Hereinafter, for a purpose of further illustration, FIG. 10 will be referenced to describe a specific implementation of optimizing performance of the robotic cell according to an embodiment of the present disclosure.

Figure 10:
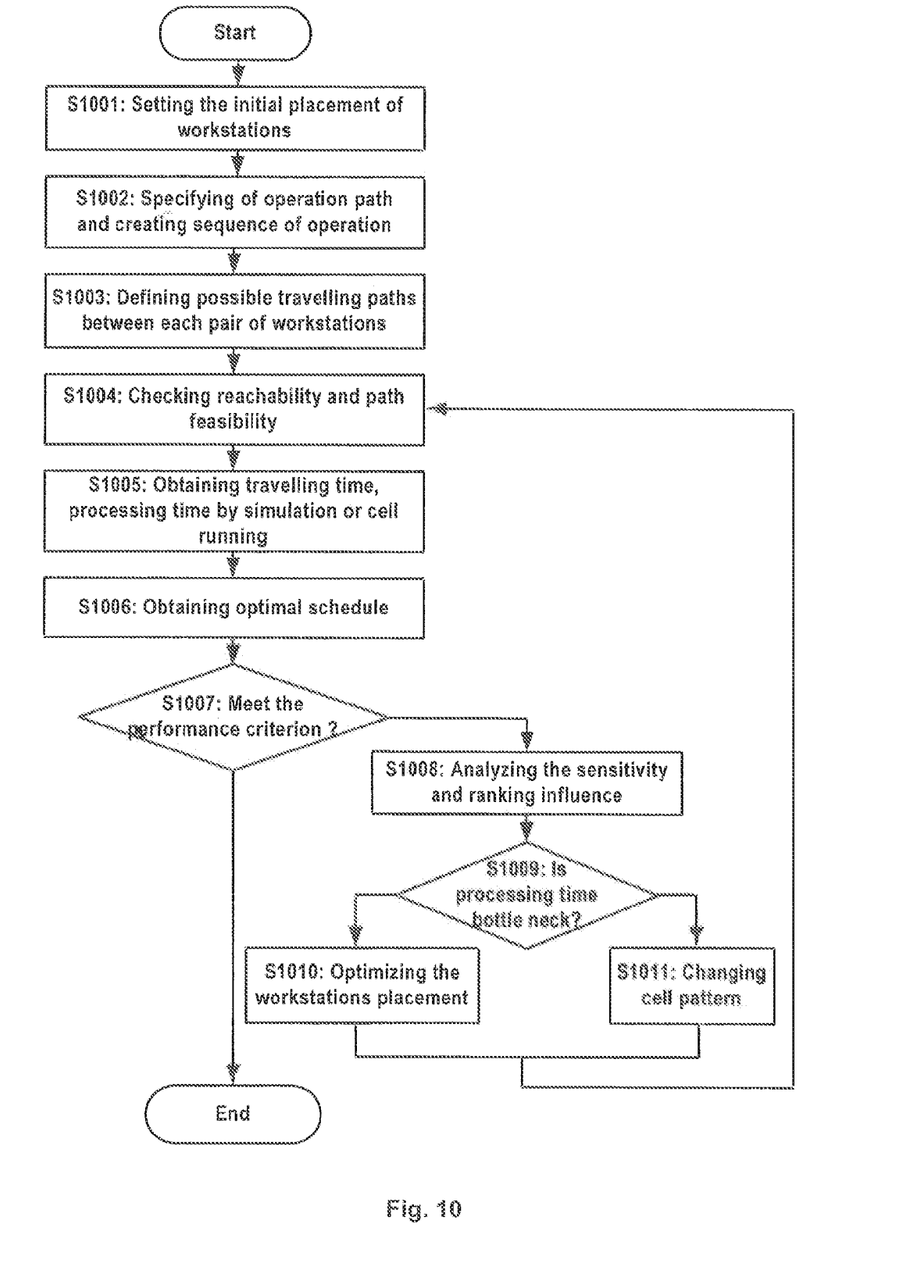
FIG. 10 schematically illustrates a flow chart of a specific implementation for optimizing performance of a robotic cell according to an embodiment of the present disclosure.

As illustrated in FIG. 10, first as step S1001, initial placement of workstations will be set for example as a default placement which allow the robotic cell to run normally. Than at step S1002, an operation path is specified and an operation sequence is created based on the placement of the workstations. Then, in accordance with the operations and the sequence, the travelling paths between each pair of workstations are defined at step S1003, and at step S1004, the reachability and path feasibility of the traveling paths are checked. Then if it passes the checking, the travelling time, processing time by cell simulation or cell running may be determined at step S1005. Then it may further obtain an optimal schedule by means a scheduling optimization method already known in the art at step S1006. The initial placement of workstation, operation path, operation sequence, travelling path and the optimal schedule may be taken as an initial cell layout.

After that, it may be determined whether the initial cell layout meets the performance criterion at step S1007. If the initial cell layout meets the performance criterion, for example a predetermine throughput as specified by the customer, the method may be ended. Otherwise, it the initial cell layout does not meet the performance criterion, then the method may proceed into step S1008, at which sensitivity analysis is preformed and influence of factors of each workstation on the performance of the robotic cell is ranked. Then based on the ranking, it may determine one of the factors and the workstation which have the greatest influence on the performance of the robotic cell. Then at step S1009, it is determined whether the processing time is bottle neck of the robotic cell, i.e., the factor most sensitive to the processing time. If the processing time is the bottle neck, then it may perform a performance optimization process regarding cell pattern with scheduling at step S1010, for example to find an optimal cell pattern by determining a number of workstations which can achieve cost effectiveness from sensitivity analysis results. On the other hand, if the processing time is not the bottle neck, the workstation placement may be optimized for example by means of any known workstation placement optimization scheme at step S1011. The steps of S1004 to 1011 may be performed repeatedly until a cell layout meeting the performance criterion is found.

Hereinbefore, the specific implement of optimizing performance of the robotic cell is described with reference to FIG. 10. However, it may be appreciated that the specific implementation is given only for a purpose of illustration and the present disclosure is not limited thereto and many modification, variation, addition thereto are also possible. For example, in another embodiment of the present disclosure, the initial cell layout may comprise a scheduling scheme without being optimized. In a further embodiment of the present disclosure, it only is to find the most influence of a factor of a workstation on the performance of the robotic cell instead of ranking all influence.

Additionally, in the present disclosure, there is also provided an apparatus for optimizing performance of a robotic cell and next reference will be made to FIG. 11 to describe example embodiments of the apparatus as provided in the present disclosure.

Figure 11:
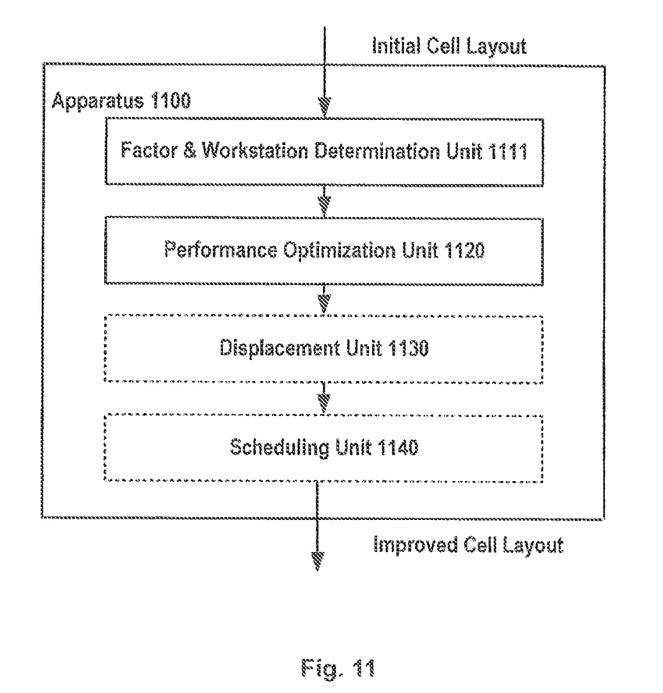
FIG. 11 schematically illustrates a block diagram of an apparatus for improving performance of a robotic cell in a robotic laser cell according to an embodiment of the present disclosure.

As illustrated in FIG. 11, the apparatus 1100 may comprises a factor and workstation determination unit 1110 and a performance optimization unit 1120. The factor and workstation determination unit 1110 may be configured to determine a factor and a corresponding workstation sensitive to the performance of a robotic cell which comprises at least one workstation and at least one robot, by performing a sensitivity analysis on an initial cell layout for the robotic cell. The performance optimization unit 1120 may be configured to perform a performance optimization process on the corresponding workstation based on the determined factor to obtain an improved cell layout for the robotic cell.

In an embodiment of the present disclosure, the factor and workstation determination unit 1110 may be further configured to perform a sensitivity analysis on the at least one workstation in the robotic cell regarding processing time and travelling time; rank influences of the processing time and the travelling time on the at least one work station based on sensitivity analysis results; and determine one of the processing time and the travelling time and a workstation associated therewith which have the greatest influence on the performance of the robotic cell as the factor and the corresponding workstation sensitive to the performance of the robotic cell.

In another embodiment of the present disclosure, the performance optimization unit may be configured to perform, if the determined factor is processing time, a performance optimization process regarding a robotic cell pattern with scheduling.

In a further embodiment of the present disclosure the performance optimization process regarding a robotic cell pattern with scheduling may comprise at lease one of robotic cell pattern optimization and operations sequences optimization.

In a still further embodiment of the present disclosure, if the robotic cell pattern optimization is performed, the optimal number of workstations that can be newly added in the robotic cell may be further determined by determining a number of workstations which can achieve cost effectiveness from sensitivity analysis results.

In a yet further embodiment of the present disclosure, the performance optimization unit may be configured to perform, if the determined factor is travelling time, a performance optimization process regarding workstation displacement.

In a still yet further embodiment of the present disclosure, the factor and workstation determination unit 1110 and the performance optimization unit 1120 may be configure to operate repeatedly with an improved cell layout newly obtained as a new initial cell layout until an improved cell layout meeting the performance requirement is obtained.

In a yet still embodiment of the present disclosure, the apparatus may further comprise a displacement unit 1130 configured to perform displacement of the at least one workstation based on the improved cell layout; and/or a scheduling unit 1140 configured to perform a robotic cell scheduling based on the improved cell layout.

It is noted that the apparatus 1100 may be configured to implement functionalities as described with reference to FIGS. 3 to 10. Therefore, for details about the operations of modules in these apparatus, one may refer to those descriptions made with respect to the respective steps of the methods with reference to FIGS. 3 to 10.

It is further noted that the components of the apparatus 1100 may be embodied in hardware, software, firmware, and/or any combination thereof. For example, the components of apparatus 1100 may be respectively implemented by a circuit, a processor or any other appropriate device with sufficient data processing power. Those skilled in the art will appreciate that the aforesaid examples are only for illustration instead of limitation.

In some embodiment of the present disclosure, the apparatus 1100 may comprise at least one processor. The at least one processor suitable for use with embodiments of the present disclosure may include, by way of example, both general and special purpose processors already known or developed in the future. The apparatus 600 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compilable or interpretable programming languages. In accordance with embodiments, the computer executable instructions may be configured, with the at least one processor, to cause apparatus 1100 to at least perform operations according to the method as discussed with reference to FIGS. 3 to 10.

It should be noted that in the foregoing description, specific details are presented only for a purpose of illustration, and the present disclosure is not limited thereto. For example, the initial cell layout may comprise a scheduling scheme without being optimized. Moreover, the ranking of influence of factors of each workstation on the performance of the robotic cell may be replaced by finding the most influence of a factor of a workstation on the performance of the robotic cell instead of ranking all influence.

Besides, hereinbefore, embodiments of the present disclosure are described with reference to the productivity. However the present disclosure it not limited thereto, as a matter a fact, the performance may also be life time, power saving and etc., and the sensitivity analysis may be performed regarding their respective relevant process parameters.

Additionally, based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in the companying drawings may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for optimizing performance of a robotic cell, wherein the robotic cell comprises at least one workstation and at least one robot, the method comprising:
   determining a factor and a corresponding workstation sensitive to the performance of the robotic cell by performing a sensitivity analysis on an initial cell layout for the robotic cell; and
   performing a performance optimization process on the corresponding workstation based on the determined factor to obtain an improved cell layout for the robotic cell;
   wherein the determining a factor and a corresponding workstation sensitive to the performance of the robotic cell comprises:
      performing a sensitivity analysis on the at least one workstation in the robotic cell regarding processing time and travelling time;
      ranking influences of the processing time and the travelling time on the at least one work station based on sensitivity analysis results; and
      determining one of the processing time and the travelling time and a workstation associated therewith which have the greatest influence on the performance of the robotic cell as the factor and the corresponding workstation sensitive to the performance of the robotic cell;
   wherein if the determined factor is processing time, a performance optimization process regarding a robotic cell pattern with scheduling is performed.

2. The method according to claim 1, wherein the performance optimization process regarding a robotic cell pattern with scheduling comprises at least one of robotic cell pattern optimization and operations sequences optimization.

3. The method according to claim 2, wherein if the robotic cell pattern optimization is to be performed, the optimal number of workstations that can be newly added in the robotic cell is further determined by determining a number of workstations which can achieve cost effectiveness from sensitivity analysis results.

4. The method according to claim 1, wherein if the determined factor is travelling time, a performance optimization process regarding workstation displacement is performed.

5. The method according to claim 1, wherein the determining a factor and a corresponding workstation and the performing a performance optimization process are repeated with an improved cell layout newly obtained as a new initial cell layout until an improved cell layout meeting the performance requirement is obtained.

6. The method according to claim 1, further comprising:
   performing displacement of the at least one workstation and/or a robotic cell scheduling based on the improved cell layout.

7. An apparatus for optimizing performance of a robotic cell, wherein the robotic cell comprises at least one workstation and at least one robot, the apparatus comprising:
   a factor and workstation determination unit, configured to determine a factor and a corresponding workstation sensitive to the performance of the robotic cell by performing a sensitivity analysis on an initial cell layout for the robotic cell; and
   a performance optimization unit configured to perform a performance optimization process on the corresponding workstation based on the determined factor to obtain an improved cell layout for the robotic cell;
   wherein the factor and workstation determination unit is further configured to:
   perform a sensitivity analysis on the at least one workstation in the robotic cell regarding processing time and travelling time;
   rank influences of the processing time and the travelling time on the at least one work station based on sensitivity analysis results; and
   determine one of the processing time and the travelling time and a workstation associated therewith which have the greatest influence on the performance of the robotic cell as the factor and the corresponding workstation sensitive to the performance of the robotic cell.

8. The apparatus according to claim 7, wherein the performance optimization unit is configured to perform, if the determined factor is processing time, a performance optimization process regarding a robotic cell pattern with scheduling.

9. The apparatus according to claim 8, wherein the performance optimization process regarding a robotic cell pattern with scheduling comprises at least one of robotic cell pattern optimization and operations sequences optimization.

10. The apparatus according to claim 9, wherein if the robotic cell pattern optimization is performed, the optimal number of workstations that can be newly added in the robotic cell is further determined by determining a number of workstations which can achieve cost effectiveness from sensitivity analysis results.

11. The apparatus according to claim 7, wherein the performance optimization unit is configured to perform, if the determined factor is travelling time, a performance optimization process regarding workstation displacement.

12. The apparatus according to claim 7, wherein the factor and workstation determination unit and the performance optimization unit are configured to operate repeatedly with an improved cell layout newly obtained as a new initial cell layout until an improved cell layout meeting the performance requirement is obtained.

13. The apparatus according to claim 7, further comprising:
a displacement unit configured to perform displacement of the at least one workstation based on the improved cell layout; and
a scheduling unit configured to perform a robotic cell scheduling based on the improved cell layout.

14. The method according to claim 1, wherein if the determined factor is travelling time, a performance optimization process regarding workstation displacement is performed.

15. The method according to claim 1, wherein the determining a factor and a corresponding workstation and the performing a performance optimization process are repeated with an improved cell layout newly obtained as a new initial cell layout until an improved cell layout meeting the performance requirement is obtained.

16. The method according to claim 1, further comprising:
performing displacement of the at least one workstation and/or a robotic cell scheduling based on the improved cell layout.

17. The apparatus according to claim 8, wherein the performance optimization unit is configured to perform, if the determined factor is travelling time, a performance optimization process regarding workstation displacement.

18. The apparatus according to claim 8, wherein the factor and workstation determination unit and the performance optimization unit are configured to operate repeatedly with an improved cell layout newly obtained as a new initial cell layout until an improved cell layout meeting the performance requirement is obtained.

19. The apparatus according to claim 8, further comprising:
a displacement unit configured to perform displacement of the at least one workstation based on the improved cell layout; and
a scheduling unit configured to perform a robotic cell scheduling based on the improved cell layout.

* * * * *